US012127991B2

(12) United States Patent
Daley

(10) Patent No.: US 12,127,991 B2
(45) Date of Patent: Oct. 29, 2024

(54) EXERCISE DEVICE HAVING TELESCOPING ELEMENTS

(71) Applicant: Zackary Daley, Sunnyside, NY (US)

(72) Inventor: Zackary Daley, Sunnyside, NY (US)

( * ) Notice: Subject to any disclaimer, the term of this patent is extended or adjusted under 35 U.S.C. 154(b) by 636 days.

(21) Appl. No.: 16/404,706

(22) Filed: May 6, 2019

(65) Prior Publication Data

US 2019/0336387 A1 Nov. 7, 2019

Related U.S. Application Data

(60) Provisional application No. 62/666,794, filed on May 4, 2018.

(51) Int. Cl.

| | |
|---|---|
| ***A61H 15/00*** | (2006.01) |
| ***A63B 21/04*** | (2006.01) |
| ***A63B 21/055*** | (2006.01) |

(52) U.S. Cl.

CPC ..... *A61H 15/0092* (2013.01); *A63B 21/0442* (2013.01); *A63B 21/0552* (2013.01); *A61H 2015/0028* (2013.01); *A61H 2201/0192* (2013.01); *A61H 2201/1261* (2013.01); *A61H 2201/1635* (2013.01); *A61H 2201/169* (2013.01)

(58) Field of Classification Search

CPC ........ A61H 15/0092; A61H 2015/0028; A61H 2201/0192; A61H 2201/1261; A61H 2201/1635; A61H 2201/169; A61H 15/00; A61H 2015/0014; A61H 2201/0153; A61H 2201/0157; A61H 1/00; A63B 21/0442; A63B 21/0552; A63B 21/0557; A63B 23/1218; A63B 2023/006; A63B 2210/50; A63B 2225/09; A63B 21/4019; A63B 21/4043; A63B 23/1236; A63B 23/1281

See application file for complete search history.

(56) References Cited

U.S. PATENT DOCUMENTS 285,476 A * 9/1883 Frink ........................ F28F 5/02
165/DIG. 161
1,247,162 A * 11/1917 Southwick ............. A21C 3/021
492/14
2,229,841 A * 1/1941 Eyraud .................... A45D 2/42
132/237
3,343,837 A * 9/1967 Grzybowski ...... A63B 21/0004
482/126
3,638,939 A * 2/1972 Langley ............... A61H 1/0244
15/230.11

(Continued)

*Primary Examiner* — Garrett K Atkinson

(57) ABSTRACT

The present invention relates to an exercise device having telescoping elements. In an embodiment, the exercising device comprises a first bar, two second bars telescopically connected to either end of the first bar, and two third bars telescopically connected to the distal end of the respective second bar. The first bar further incorporates at least one foam roller circumferentially encircling a middle section of the first bar. The second bars are slidably attached to either side of the first bar. Each third bar is further attached to the distal end of each second bar, such that each third bar is slidably positioned inside the second bar in the first direction. Further, each third bar is slidably extendable from the second bars in the second direction. The telescoping motion may be actuated by a switch or rotation of one or more handles of the exercising tool.

4 Claims, 7 Drawing Sheets

(56) References Cited

U.S. PATENT DOCUMENTS

| | | | | | |
|---|---|---|---|---|---|
| 3,831,238 | A * | 8/1974 | Adams | B05C 17/0217 | 492/14 |
| 4,136,867 | A * | 1/1979 | Wilkin | A63B 22/20 | 601/46 |
| 4,179,119 | A * | 12/1979 | Wolf | A63B 5/20 | 482/82 |
| 4,314,395 | A * | 2/1982 | Brock | E04F 21/22 | D8/51 |
| 4,334,445 | A * | 6/1982 | Timewell | B25G 1/063 | 81/177.8 |
| 4,345,757 | A * | 8/1982 | Lo Voi | A63B 21/0004 | 601/120 |
| 4,618,142 | A * | 10/1986 | Joseph, Jr. | A63B 21/0724 | 482/106 |
| 4,639,961 | A * | 2/1987 | Chasan | A47C 27/085 | 5/673 |
| 4,712,539 | A * | 12/1987 | Kim | A61H 15/0092 | 601/120 |
| 4,862,542 | A * | 9/1989 | Jordan | A47C 21/00 | 5/673 |
| 5,000,671 | A * | 3/1991 | Nolte | B44B 5/0009 | 425/231 |
| 5,261,866 | A * | 11/1993 | Mattox | A63B 22/20 | 482/125 |
| 5,300,002 | A * | 4/1994 | Freye | A63B 23/03516 | 482/45 |
| 5,364,338 | A * | 11/1994 | Terashima | A61H 15/0092 | 601/118 |
| 5,499,961 | A * | 3/1996 | Mattox | A63B 21/4049 | 482/123 |
| 5,925,077 | A * | 7/1999 | Williamson | A61F 2/4609 | 623/22.34 |
| 6,280,369 | B1 * | 8/2001 | Gibran | A21C 3/021 | 492/14 |
| 6,638,201 | B1 * | 10/2003 | Dischler | A63B 22/20 | 482/132 |
| 7,175,573 | B1 * | 2/2007 | Huang | A63B 21/0004 | 446/236 |
| 7,291,101 | B2 * | 11/2007 | Deal | A63B 21/0004 | 482/121 |
| 7,322,905 | B2 * | 1/2008 | Morris | A63B 69/345 | 73/379.06 |
| 7,387,599 | B1 * | 6/2008 | Hsu | A63B 21/0552 | 601/118 |
| 7,404,228 | B2 * | 7/2008 | Hodges | B05C 17/0217 | 492/19 |
| 7,837,603 | B1 * | 11/2010 | Carnell, Sr. | A63B 21/0004 | 482/140 |
| 7,922,634 | B1 * | 4/2011 | Wu | A63B 23/1263 | 482/121 |
| 9,132,315 | B1 * | 9/2015 | Chen | A63B 23/14 | |
| 9,415,258 | B1 * | 8/2016 | Higgins | A63B 21/00065 | |
| 9,808,665 | B1 * | 11/2017 | Demarais | A63B 21/4035 | |
| 9,849,060 | B2 * | 12/2017 | Ishibashi | A61H 15/0092 | |
| 10,799,419 | B2 * | 10/2020 | Morris | A61H 15/00 | |

| | | | | | |
|---|---|---|---|---|---|
| 2002/0111256 | A1 * | 8/2002 | Tuller | A63B 23/0244 | 482/140 |
| 2003/0050153 | A1 * | 3/2003 | Stevens | A63B 21/0603 | 482/92 |
| 2003/0134726 | A1 * | 7/2003 | Yu | A63B 21/00043 | 482/110 |
| 2003/0158023 | A1 * | 8/2003 | Yu | A63B 23/12 | 482/126 |
| 2004/0040111 | A1 * | 3/2004 | Er | B05C 17/0217 | 492/19 |
| 2005/0202944 | A1 * | 9/2005 | Deal | A63B 21/0004 | 482/121 |
| 2007/0173749 | A1 * | 7/2007 | Williams | A61H 9/005 | 601/134 |
| 2008/0167168 | A1 * | 7/2008 | Hurst | A63B 22/20 | 482/132 |
| 2009/0064436 | A1 * | 3/2009 | Scott, Sr. | B05C 17/0217 | 15/230.11 |
| 2011/0207101 | A1 * | 8/2011 | Garner | A63B 69/0071 | 434/248 |
| 2012/0100969 | A1 * | 4/2012 | Brodbeck | A63B 21/4015 | 482/132 |
| 2012/0157274 | A1 * | 6/2012 | MacColl | A63B 21/00185 | 482/132 |
| 2012/0259257 | A1 * | 10/2012 | Nelson | A61H 39/04 | 601/119 |
| 2012/0309599 | A1 * | 12/2012 | Miller, Jr. | A63B 22/20 | 482/139 |
| 2013/0017936 | A1 * | 1/2013 | Olson | A63B 21/4049 | 482/132 |
| 2014/0128786 | A1 * | 5/2014 | Ross | A61H 15/0092 | 601/118 |
| 2015/0202117 | A1 * | 7/2015 | Ishibashi | A61H 15/0092 | 601/119 |
| 2016/0058656 | A1 * | 3/2016 | Harvel | A61H 15/00 | 601/122 |
| 2017/0203146 | A1 * | 7/2017 | Greenhouse | A63B 21/4049 | |
| 2019/0151189 | A1 * | 5/2019 | Morris | A61H 15/0092 | |
| 2019/0269573 | A1 * | 9/2019 | Paniccia | A61H 7/007 | |
| 2020/0397650 | A1 * | 12/2020 | Morris | A61H 15/0092 | |

* cited by examiner

EXERCISE DEVICE HAVING TELESCOPING ELEMENTS

CROSS-REFERENCE TO RELATED APPLICATIONS

This application claims priority to U.S. Provisional Application No. 62/666,794, filed on May 4, 2018, which is incorporated herein by reference as if set forth in full.

FIELD OF THE INVENTION

The present invention relates generally to an exercise device or an exercise tool, and, more particularly, relates an exercise device that incorporated telescoping arms that allow the user to modify the device for various activities such as exercises, massaging, and warm-up activities. Prior to the present invention, such a variety of exercises and uses could only be performed using a multitude of different exercise devices or tools.

BACKGROUND OF THE INVENTION

Exercise is an integral part of personal fitness, overall health and wellbeing of any individual. Various exercises are performed by athletes and non-athletes alike to strengthen muscles, maintain good cardiovascular health, improve athletic skills, increase joint stability and mobility, and attain a desired weight and/or body mass index. Personal exercise devices and systems are commonly used by the individuals who seek alternative means of maintaining fitness. These systems are utilized as in-home systems, which permit quick, efficient workouts to be completed within a relatively short span of time. These type of systems may include pushup bars, accessories and elastic cord-based systems. One example of a pushup-based system is the Perfect Pushup®, which includes a pair of rotating handlebars resting on the floor at a distance from each other to enable the user performing pushup while gripping the handlebars.

The TRX® Rip Trainer is an example of an elastic cord type system, which includes an elastic cord irremovably connected at one end to the tip of a stick and secured at the other end to an immovable object. The use of the TRX® Rip Trainer is such that the elastic cord provides resistance to the user swinging the stick much like a baseball bat. However, each of these type of systems have certain disadvantages: these devices or systems allow the user to undertake one, and no more than a small number of exercises. The purchase of an expensive all-in-one home gym system is an alternate to purchasing a membership to a non-home gym. However, the user is unable to take full advantage of these systems to perform all range of exercises that would be available only at the gym without purchasing multiple different personal exercise systems. Additionally, these systems as well as gym stations do not permit users the ability to transition quickly from one exercise to another.

In the light of above described problems and issues, there exists a need for a cost-effective, and efficient multi-functional exercise device or exercise tool.

SUMMARY OF THE INVENTION

The present invention overcomes the disadvantages of the prior art and fulfills the needs described above by providing exercise devices having telescoping elements that allow a user to perform a multitude of exercises using one reconfigurable device.

The present invention relates to an exercise device or tool having telescoping elements. The telescopic exercising tool is a multifunctional device tool used to perform a wide variety exercises. A user could perform warm up, work out, and recovery exercise using the single telescopic exercising device or tool. The telescopic exercising tool could be used in various stages, steps or settings.

One preferred embodiment of the invention is a telescopic exercising tool comprises a first bar, two second bars, and at least two third bars. The first bar may comprise one or more foam rollers, each foam roller in turn may have a plurality of ridges and a spinal crease. The two second bars are provided on both sides of the first bar, wherein the second bars are slidably positioned inside the first bar in a first direction. Further, the second bars are slidably extended from the first bar in a second direction. Each third bar is attached to the second bars configured to slidably positioned inside the second bars in the first direction. Further, each third bar is slidably extended from the second bar in the second direction, by an application of pressure on, or rotation of one or more handles.

Another preferred embodiment of the invention is an exercise device having telescoping elements, comprising a hollow central cylinder element having a first and second distal end; two first cylinder elements each having a proximal and distal end, wherein each of said first cylinder elements are slidably connected to said hollow central cylinder such that each said first cylinder element proximal end fits within a respective distal end of said hollow central cylinder; two handles each having a proximal and distal end, wherein each of said handles proximal ends are attached to a respective distal end of each of said first cylinder elements.

Still another preferred embodiment of the invention is a An exercise device having telescoping elements, comprising a hollow central cylinder element having a first and second distal end; two first cylinder elements each having a proximal and distal end, wherein each of said first cylinder elements are slidably connected to said hollow central cylinder such that each said first cylinder element proximal end fits within a respective distal end of said hollow central cylinder; two second cylinder elements each having a proximal and distal end, wherein each of said second cylinder elements are slidably connected to respective said first cylinder elements such that each said second cylinder element proximal end fits within a respective distal end of each of said first cylinder elements; and two handles each having a proximal and distal end, wherein each of said handles proximal ends are attached to a respective distal end of each of said second cylinder elements.

In one embodiment, the telescopic exercising tool further comprises the one or more handles. The handles have a gripping portion to enable the user to extend or collapse the second bars, and the third bars, according to the need of the user. The end of the handle serves or functions as a lacrosse-type ball and can assist with recovering after workouts for hard to reach areas such as your rear deltoid, latissimus dorsi, rhomboids, etc. The handle is made of a soft or hard material for example but not limited to rubber material. The handles could be made of any material that serves the purpose of this present invention.

The handles may include one or more hooks. The hooks enable the user to fix the telescopic exercising tool to a support structure to perform certain type of exercises such as but not limited to resistance training exercise. The telescopic exercising tool of the present invention, is durable, versatile tool capable of providing the user with a total body workout and meeting the needs of a wide range of users that have different strengths, limitations, and physical fitness levels.

Other objectives, features and advantages of the present invention will become apparent from the following detailed description. It should be understood, however, that the detailed description and the specific examples, while indicating specific embodiments of the invention, are given by way of illustration only, because various changes and modifications within the intended scope of the invention are within the scope of the attached claims.

BRIEF DESCRIPTION OF THE DRAWINGS

A more complete understanding of the present invention, and the advantages and features thereof, will be more readily understood by reference to the following detailed description when considered in conjunction with the accompanying drawings wherein.

DETAILED DESCRIPTION OF EMBODIMENTS

Figure 1A:
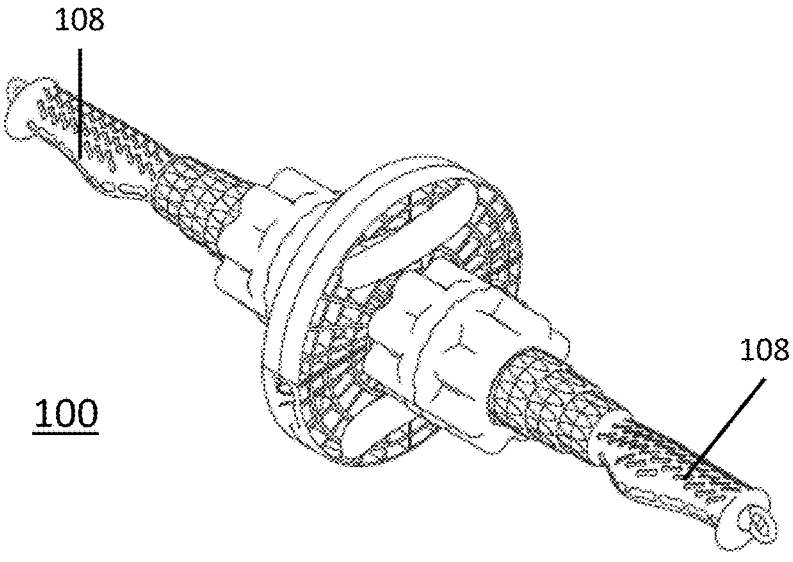
FIG. 1A is a perspective view of an exemplary embodiment of the inventive telescopic exercising tool in a fully retracted configuration.

Description of certain embodiments of the present invention is provided in the following text. It is expected that the present invention may be embodied in other specific forms or configurations without departing from the essential or core characteristics of the invention. As such, the described embodiments are to be considered as exemplary, illustrative, and are not limited or restricted to the specific embodiments shown. The scope of the invention is as provided in the attached claims along with all reasoned equivalents.

Referring to FIGS. 1A through 1C, and FIGS. 2A through 2C, a telescopic exercising tool or exercise device 100 is illustrated, according to an embodiment of the present invention. The telescopic exercising tool or exercise device 100 is a multifunctional tool, apparatus or system, wherein various exercises can be readily performed by direct use of, and easy reconfiguration of the exercise device 100. For example, a user could perform warm up, work out and recovery exercise using the single telescopic exercising tool 100 in order to develop most any muscle or muscle group. The telescopic exercise device 100 could be used in various stages, steps, settings, or configurations in order to target and allow focus on particular muscles or muscle groups. The telescopic exercising tool 100 is a durable, versatile tool capable of providing the user with a total body workout and also meet the needs of a wide range of the users having different strength levels, motion ranges, overall physical fitness levels.

In accordance with, and as shown in FIGS. 1A through 1C, and FIGS. 2A through 2C, the telescopic exercising tool 100 comprises a first bar 102, at least two second bars 104, at least two third bars 106, and one or more handles 108. The second bars 104 and the third bars 106 are telescopic bars. More particularly, the second bars 104 are slidably positionable within or inside the first bar 102 in a first direction 112.

Figure 1B:
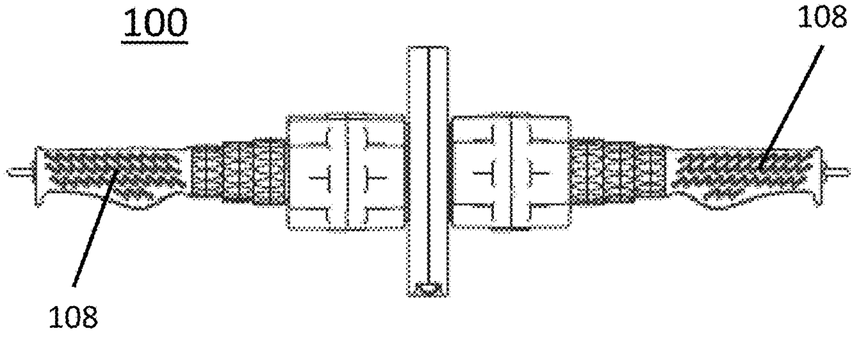
FIG. 1B is a front or top view of an exemplary embodiment of the inventive telescopic exercising tool in a fully retracted configuration.
Figure 2A:
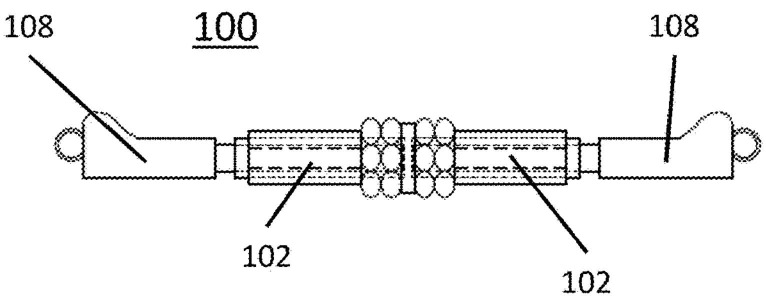
FIG. 2A is a front or top view of another exemplary embodiment of the inventive telescopic exercising tool in a fully retracted configuration.

The telescopic exercising tool 100 could be used to perform certain exercises when the second bars 104 are slidably positioned fully within or inside the first bar 102 and the third bars 106 are slidably positioned fully within or inside the second bars 104 in the first direction 112, as shown in the FIGS. 1A, 1B, and 2A. The telescopic exercising tool 100 with the second bars 104 positioned inside the first bar 102 may function as a recovery component or warm up component to perform many different simple exercises, such as motions to increase the blood flow to the muscles, i.e., a stage 1 exercise.

In one embodiment, the first bar 102 further incorporates one or more foam rollers 114 that are circumferentially formed around the first bar 102. In one embodiment, the foam rollers 114 help in performing exercise and massaging activities by the user. Such exercised are known to decrease fascia build up in muscles, and increase blood flow to the muscles.

Figure 7:
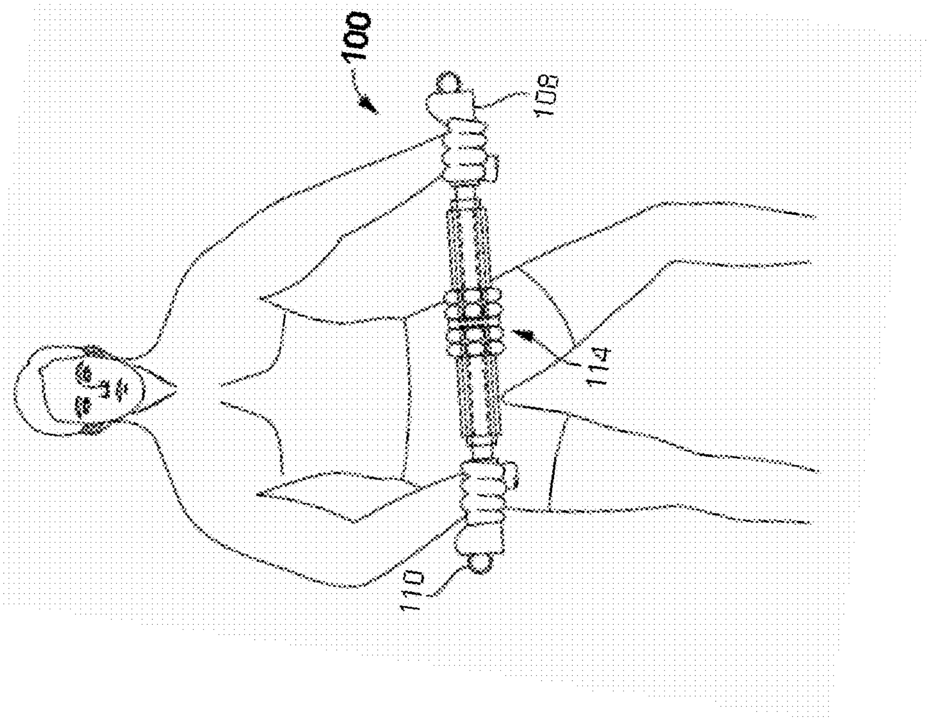
FIG. 7 is an illustration of a user performing self-myofascial release exercise using telescopic exercising tool 100 in fully retracted configuration.

In another embodiment, the foam rollers 114 may be configured to increase mobility and flexibility of the joints. In one example of usage of such a configuration, a user may perform self-myofascial release exercises using the telescopic exercising tool 100 as configured in position referred in FIGS. 1A and 2A, and is illustrated in FIG. 7. As shown, the foam rolling concept using foam rollers 114 for such self-myofascial release exercised, creates direct surface pressure to tense the muscles. The application of pressure on the muscles releases tension from the muscles, therefore increasing the mobility and blood flow of those muscles. Self-myofascial release techniques (SNRT) are well-known as effective exercises among athletes and fitness enthusiasts alike. Both allopathic and alternative therapists have embraced the use of myofascial release massage to reduce chronic pain and rehabilitate a range of injuries. Some therapists claim a long list of benefits, from curing tennis elbow to IBS relief.

Figure 5:
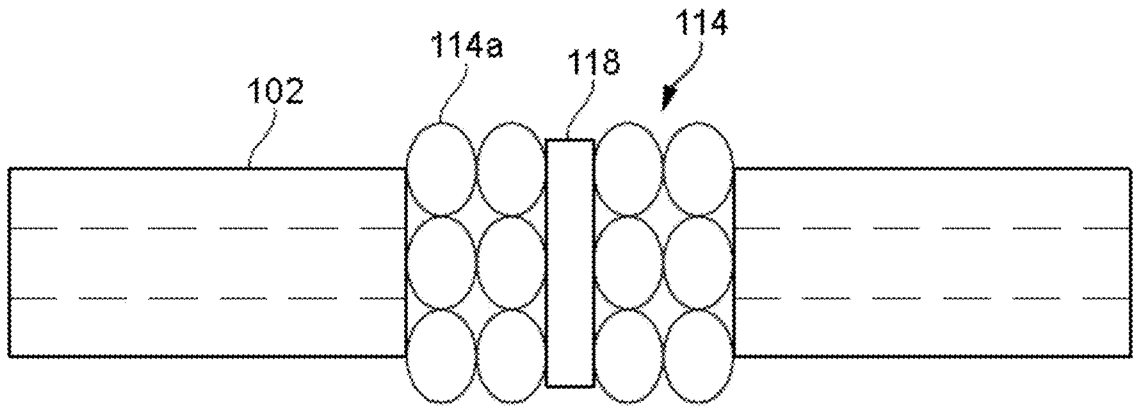
FIG. 5 is a front or top view of the center elements of an exemplary embodiment of the telescopic exercising tool, specifically showing the center roller elements.
Figure 6:
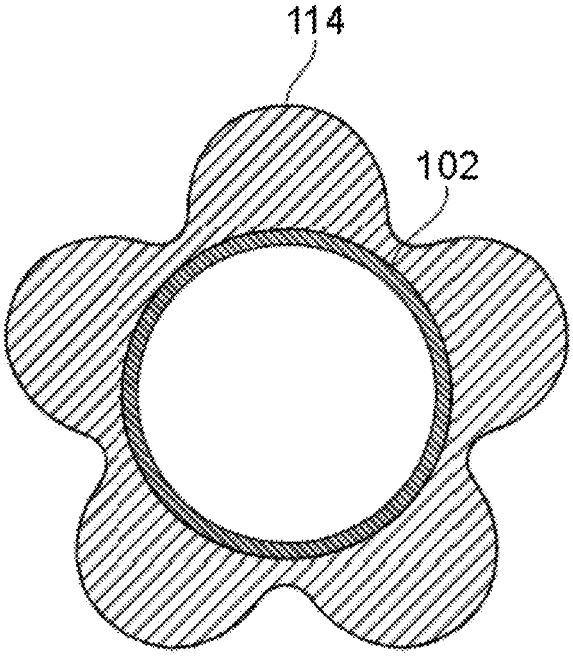
FIG. 6 is an end cutaway view of a center roller element shown in an exemplary embodiment of the telescopic exercising tool.

Referring to FIGS. 5 and 6, in one embodiment, a front view of the foam rollers 114 incorporated in the first bar 102 of the telescopic exercise tool 100 is illustrated. In varied embodiments, a base of the foam roller 114 may be manufactured from a soft or more durable material, for example but not limited to a rubber material.

In other embodiments, the foam roller 114 may comprise multiple rubber rollers 114*a*. The rubber rollers 114*a* are generally circular in shape, but not limited to any particular shape and/or size. In some embodiments, the foam roller 114 may also comprise a spinal crease 118, which is provided to separate the rubber rollers 114*a* from each other, and as shown in the FIGS. 4 and 5. A sectional view of an embodiment of the foam roller 114 is shown in FIG. 6.

Figure 2B:
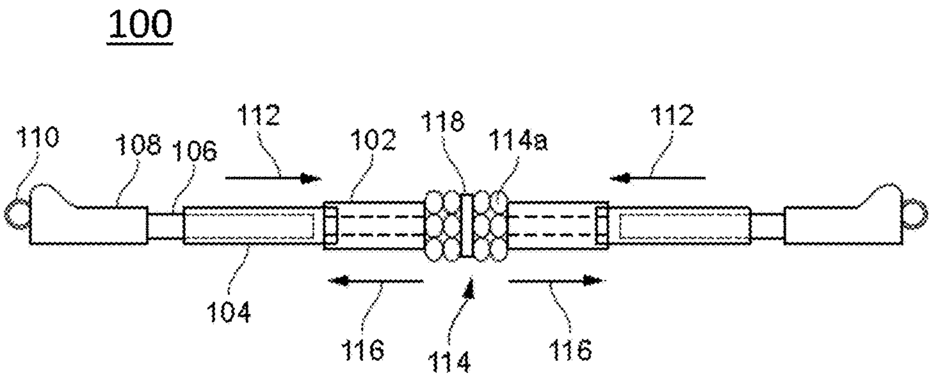
FIG. 2B is a front or top view of another exemplary embodiment of the inventive telescopic exercising tool in a partially expanded configuration.

As shown in FIG. 2B, the telescopic exercising tool 100 with at least two second bars 104 are extended fully in a second direction 116. The second bars 104 are provided on both sides of the first bar 102. Each second bar 104 is slidably positioned within or inside the first bar 102 in the first direction 112 when the telescopic exercising tool 100 is set for certain smaller range operation or use. The second bars 104 may also be slidably extended from the first bar 102 in the second direction 116, when the user needs to perform the warm up exercises or recovery component exercises. FIG. 2B represents the telescopic exercising tool 100 in the stage 2 or setting 2 position. With the second bars 104 of the telescopic exercising tool 100 extended in a full open configuration, the second bars 104 function as a work out component or a strength training component.

Figure 8:
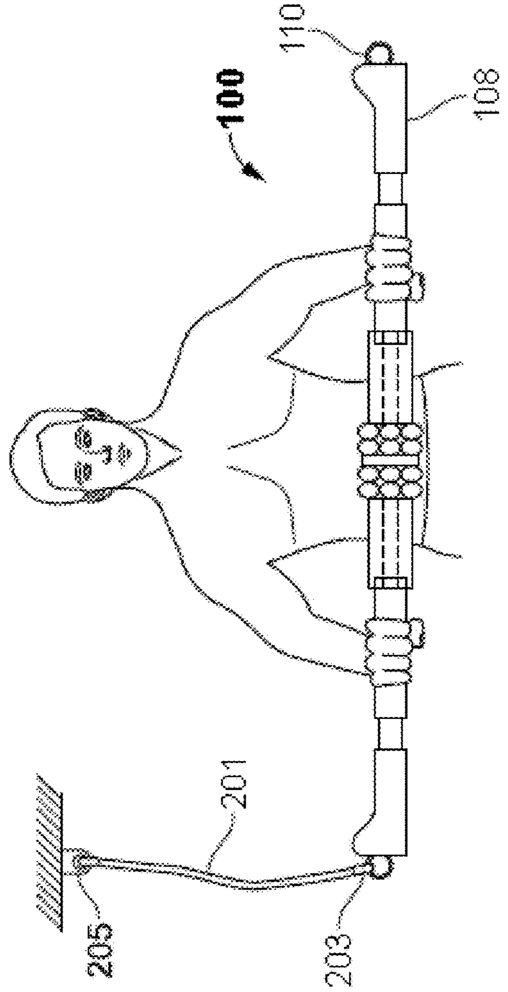
FIG. 8 is an illustration of a user performing asymmetrical chest press exercise using telescopic exercising tool 100 in a partially expanded configuration.

In one embodiment, the telescopic exercising tool 100 with the extended second bars 104 may be used for performing resistance and strength training. The telescopic exercising tool 100 as shown in FIG. 2B may be compared to other single exercise products, such as a TRX® Rip trainer. A resistance band attachment element may be formed or attached to the end of one or both of the second bars 104. With a resistance band attached to the exercise device 100, the device may be used to perform exercises that help to increase rotation of joints as well as increase the strength of the muscles surrounding those joints. Moreover, in such a configuration, the telescopic exercise device 100 allows the user to perform asymmetrical training and thereby to gain in both muscle stability and strength. In another embodiment, the telescopic exercising tool 100 may also be attached to a carabiner 203 (as shown in FIG. 8) to perform exercises such as bicep curls. In another embodiment, the third bars 106 are collapsed or slid inside the second bars 104 to allow the user to perform various exercises within the stage 2 category.

In one example, a user performing asymmetrical chest press exercise using telescopic exercising tool 100 in position (stage 2 or setting 2 position) referred in FIG. 2B, is illustrated in FIG. 8. An end of the telescopic exercising tool 100 comprising a handle 108 with one or more hooks 110, is connected to an end of resistance cord 201 via a carabiner 203. Further, another end of the resistance cord 201 is affixed on the wall via a wall anchor 205, as shown in FIG. 8. Asymmetrical chest press exercise performed using telescopic exercising tool 100 is good exercise for the anterior musculature system, neurological system, and stability and balance for core musculature system.

Figure 9:
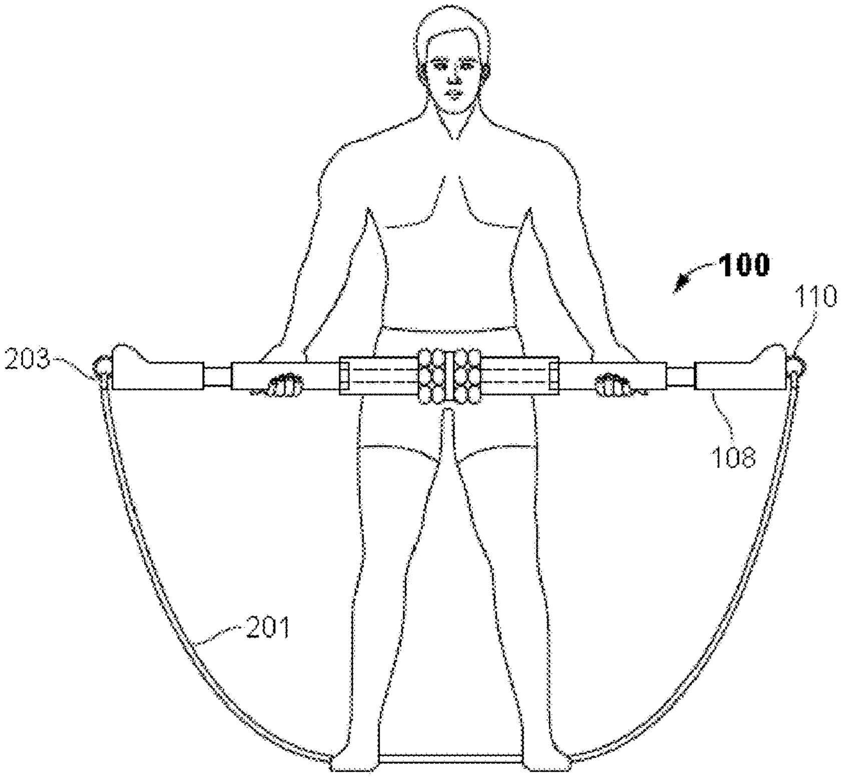
FIG. 9 is an illustration of a user performing bicep curl workout using the telescopic exercising tool 100 in a partially expanded configuration.

In another example, a user performing a bicep curl workout may use the telescopic exercising tool 100 configured as shown in FIG. 2B, and illustrated in FIG. 9. As shown, both of the handles 108 with one or more hooks 110, are connected by a resistance cord 201, via the carabiner 203. As shown in FIG. 9, the user is, in this configuration able to lift the telescopic exercising tool 100 against the resisting force of the resistance band and perform a bicep curl work-out. This stressing of the user's bicep muscles results in an increase in strength, over time, of the user's biceps.

Figure 1C:
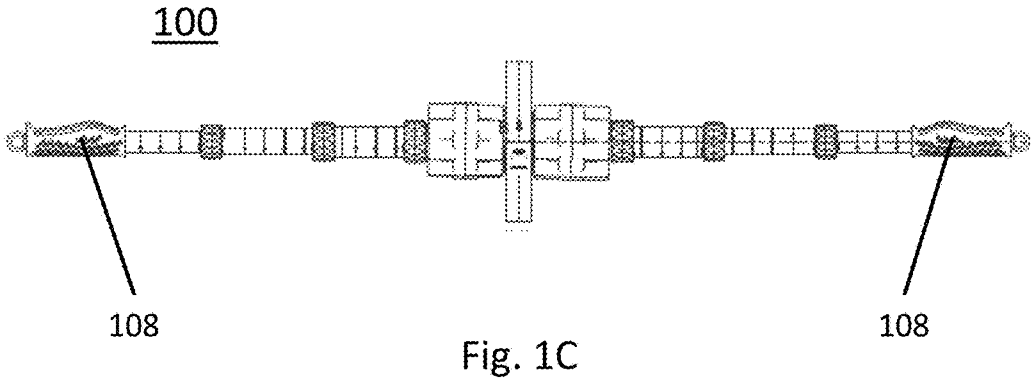
FIG. 1C is a front or top view of an exemplary embodiment of the inventive telescopic exercising tool in a fully expanded configuration.
Figure 2C:
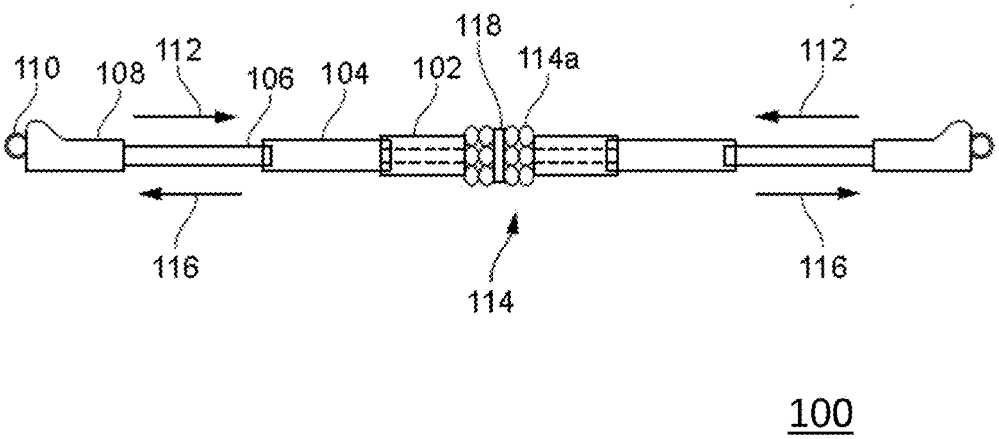
FIG. 2C is a front or top view of another exemplary embodiment of the inventive telescopic exercising tool in a fully expanded configuration.

FIGS. 1C and 2C illustrates the telescopic exercising tool 100 a further configuration with both third bars 106 fully extended in the second direction 116. As shown, the third bars 106 are slidably attached on each second bar 104 at one end. Another end of the third bars 106 are attached or joined to the handles 108. Each third bars 106 is slidably positionable within the second bars 104. As such, the third bars 106 may be slidably extended from the second bars 104 in the second direction 116, by application of pressure, or actuation of a release switch within or on the handles 108 The telescopic exercising tool 100 with the second bars 104 and the third bars 106 in their full extended position may be used as warm up device or tool. While shown in the illustrated embodiments as having second 104 and third 106 bars as slidably expanding, in other embodiments, the telescopic exercising tool may have further expanding or telescoping bars.

In different embodiments, the first bar 102, the second bars 104, and the third bars 106 may be made of a metal material such as steel or aluminum, or alternatively, these components may be manufactured from a thermoplastic material, including by way of example a polyvinyl chloride (PVC) material.

In some embodiments, the telescopic exercising tool 100 in the configuration shown in FIGS. 1C and 2C represents the third setting or third stage or third step. The exercise device 100 in this third setting could be used to perform various exercise routines such as increasing joint mobility and flexibility, including those joints that make up shoulders, elbows, and wrists. The extendable feature of the third bars 106 towards the second direction 116 may be used to increase the rotation of a user's shoulders, elbows, and/or wrists.

Figure 10:
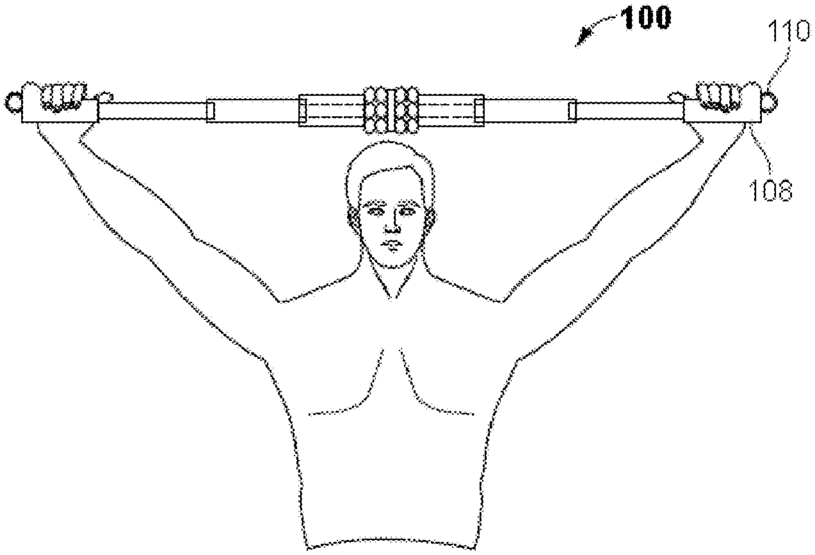
FIG. 10 is an illustration of a user performing a warm-up exercise—shoulder rotation—using an embodiment of the telescopic exercising tool 100 in fully expanded configuration.

The telescopic exercising tool 100 may be configured to monitor and assess an athlete's or user's mobility or flexibility. In one example, a user performing warm-up exercises—such as shoulder rotation using telescopic exercising tool 100 in position (third setting or third stage or third step) referred in FIGS. 1C and 2C, is illustrated in FIG. 10. Further, various types of warm-up rotational exercises may be performed by the user, using this extended position of the telescopic exercising tool 100.

Figure 3A:
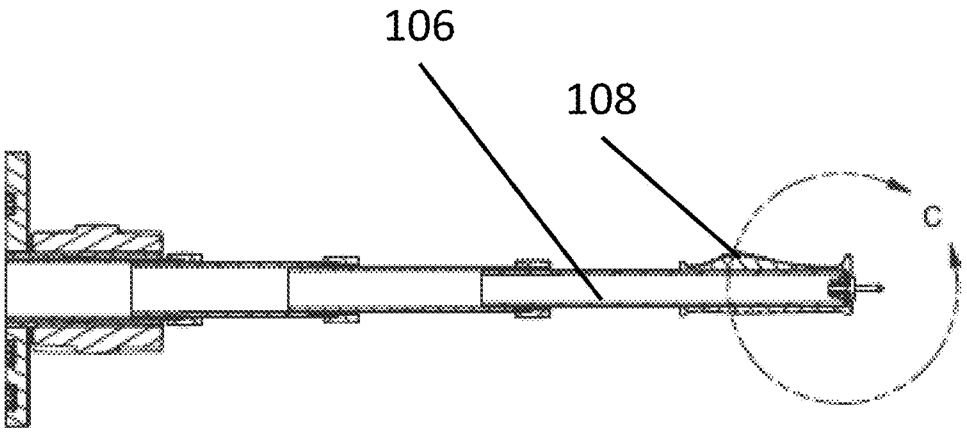
FIG. 3A is a side cutaway view of an exemplary embodiment of one side of the inventive telescopic exercising tool.
Figure 3B:
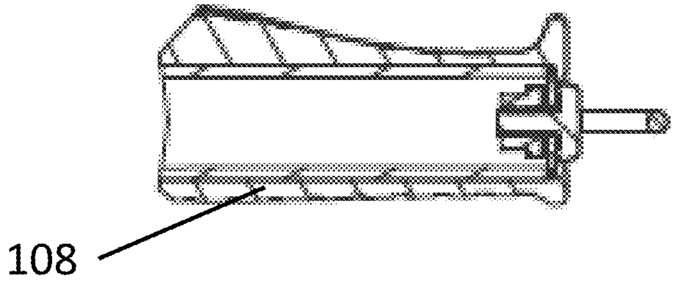
FIG. 3B is a side cutaway view of an exemplary embodiment of a handle incorporating into one side of the inventive telescopic exercising tool.
Figure 4:
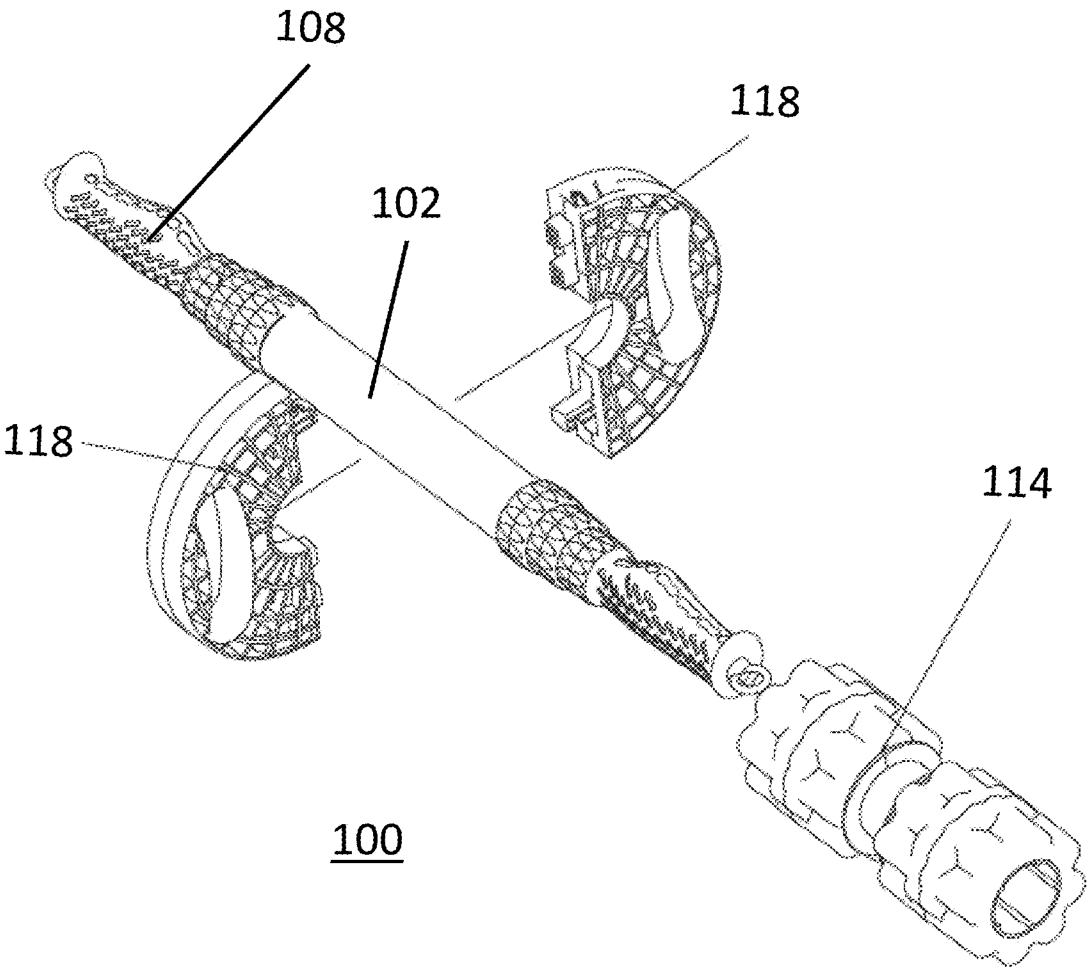
FIG. 4 is a perspective exploded view of the elements of an exemplary embodiment of the telescopic exercising tool.

Referring to FIGS. 3A, 3B, and 4, the two handles 108 of the telescopic exercising tool 100 are illustrated as attached to the end of third bars 106. Each handle 108 has a gripping portion or switch element to enable the user to extend or collapse either of the second bars 104 and/or the third bars 106, according to the exercise or configuration needs of the user. The user can hold the telescopic exercising tool 100 using the gripping portion of the handles 108 and quickly allow the user to modify the configuration of the exercise device 100 to perform different exercise routines.

The handles may also serve as and/or allow for a muscle release technique with respect to hard to reach places such as the user's lats or rear deltoids. In one embodiment, and end of one or both handles 108 may be made of a soft or durable material including a pliable rubber material. The entire handles 108 could also be made of such a material for ease of manufacture, or any material that serves the purpose of the invention objectives.

The handles 108 may also comprises one or more hooks 110, as shown in FIG. 8. The hooks 110 enable the user to fix the telescopic exercising tool 100 to a support structure to perform certain type of exercises, including but not limited to resistance training exercises. The support structures to which the telescopic exercise device 100 could be attached include, by way of examples, a wall of a room, ropes, carabiner, a rail of a free-standing rack, or any other fixed support structure.

As described, the telescopic exercising tool 100 is designed to be durable and lightweight. Moreover, the telescopic exercise device 100 allows users and athletes to perform a multitude of desired and/or required exercises without the need for several different exercise devices. The single exercise device accordingly performs multiple functions and therefore, the exercise device 100 is a multifunctional tool. The telescopic exercising tool 100 is portable, and can be easily transported between most any destinations by most any mode of transportation. The portable tool 100 according to the present invention, is not only useful for independent trainers but also useful for home fitness enthusiasts. The user could perform almost any type of fitness exercise using the disclosed and described single telescopic exercise device 100.

Although certain embodiments of the invention have been illustrated in the accompanying drawings and described in the above detailed description, it will be understood that the invention is not limited to the specific embodiments disclosed and described herein. More particularly, the invention may have numerous rearrangements, modifications, substitutions of parts and elements without departing from the scope of the invention as provided in the following claims.

The foregoing description comprises illustrative embodiments of the present invention. Having thus described exemplary embodiments of the present invention, it should be noted by those skilled in the art that the above disclosure is exemplary only, and that various other alternatives, adaptations, and modifications could be made and are within the scope of the present invention. Many modifications and other embodiments of the invention will come to mind to one skilled in the art to which this invention pertains having the benefit of the teachings presented in the foregoing descriptions. Although specific terms could be employed herein, they are used only in generic and descriptive sense and not for purposes of limitation.

What I claim as my invention is:

1. An exercise device having at least two telescoping elements, comprising:

a. A hollow central cylinder element having a first and second distal end;

b. A foam massage roller circumferentially encircling a middle section of said hollow central cylinder and configured to freely rotate around the central cylinder;

c. Two first cylinder elements each having a proximal and distal end, wherein each of said first cylinder elements are slidably connected within said hollow central cylinder such that each said first cylinder element proximal end fits within a respective distal end of said hollow central cylinder, such that each said first cylinder elements freely slides a substantial length of said first cylinder elements within said hollow central cylinder, and can telescope and lock in place to lengthen or shorten the full length of said exercise device;

d. At least one foam roller spinal crease circumferentially encircling a middle section of said hollow central cylinder, wherein said at least one foam roller spinal crease extends beyond the surface of the foam roller; and e. Two hand grip handles each having a proximal and distal end, wherein each of said hand grip handles proximal ends are attached to a respective distal end of each of said first cylinder elements, wherein said hand grip handles are elongate and coaxial with the central cylinder element and configured to be grasped by a user with a closed first grip.

2. The exercise device having telescoping elements, as provided in claim 1, further comprising a massage element attached to said distal end of at least one of said two handles.

3. The exercise device having telescoping elements, as provided in claim 1, further comprising a locking element within each of said first cylinder elements to hold said respective first cylinder in a fixed position within said hollow central cylinder, wherein said locking element is actuated and released by a switch element in each said handle connected to said respective first cylinder elements.

4. The exercise device having telescoping elements, as provided in claim 1, further comprising a locking element within each of said first cylinder elements to hold said respective first cylinder in a fixed position within said hollow central cylinder, wherein said locking element is actuated and released by rotating said respective handle connected to said first cylinder elements by approximately ninety degrees.

* * * * *